United States Patent [19]

Nakashima et al.

[11] Patent Number: 4,506,909
[45] Date of Patent: Mar. 26, 1985

[54] SHOCK ABSORBER CONTROL SYSTEM AND METHOD OF CONTROLLING THE SAME

[75] Inventors: Noriyuki Nakashima, Aichi; Yoshinori Ishiguro, Kariya, both of Japan

[73] Assignee: Nippondenso Co., Ltd., Kariya, Japan

[21] Appl. No.: 453,153

[22] Filed: Dec. 27, 1982

[30] Foreign Application Priority Data

Dec. 28, 1981 [JP] Japan .................. 56-210632

[51] Int. Cl.³ .............................................. B60G 17/00
[52] U.S. Cl. .................. 280/707; 267/64.15
[58] Field of Search ............ 280/707; 267/64.15, 267/64.18, 64.22

[56] References Cited

U.S. PATENT DOCUMENTS

| | | | |
|---|---|---|---|
| 3,603,612 | 7/1971 | Hill | 280/707 |
| 3,995,883 | 12/1976 | Glaze | 280/707 |
| 4,065,154 | 12/1977 | Glaze | 280/707 |
| 4,159,106 | 6/1979 | Nyman | 267/64.15 |
| 4,215,403 | 7/1980 | Pollard et al. | 280/707 |
| 4,333,668 | 6/1982 | Hendrickson et al. | 280/707 |
| 4,368,900 | 1/1983 | Beusse | 280/707 |

Primary Examiner—Joseph F. Peters, Jr.
Assistant Examiner—Kenneth R. Rice
Attorney, Agent, or Firm—Cushman, Darby & Cushman

[57] ABSTRACT

A shock absorber control system for a motor vehicle having shock absorbers in which the system comprises a vehicle speed sensor and an operation control device for calculating acceleration and deceleration of the vehicle in accordance with the vehicle speed signal from the speed sensor and for producing control signals to the shock absorbers, thereby regulating the attenuation forces of the shock absorbers in accordance with road conditions.

15 Claims, 6 Drawing Figures

SHOCK ABSORBER CONTROL SYSTEM AND METHOD OF CONTROLLING THE SAME

BACKGROUND OF THE INVENTION

1. Field of the Invention

The present invention relates to a shock absorber control system, particularly to a shock absorber control system which determines bad road conditions in accordance with a speed signal from a vehicle speed sensor and regulates the attenuation forces of the shock absorbers in response to the road conditions and a method of controlling the same.

2. Description of the Prior Art

Recently, highways and roads for motor vehicles are being highly equipped. However, there still remain unpaved roads such as gravel roads and dirt roads and how to maintain stable steering and running of vehicles on these bad roads has become a major problem.

Namely, when running on a bad road, vehicle handling becomes uncontrollable w,ich directly results not only from the road conditions, but also from the difficulty due to bounding and rebounding forward and backward, and right and left as well as rolling of the vehicle body.

Now, the inventor has found that the following differences occur when driving a vehicle both on good roads and bad roads. That is, as shown in FIG. 1, when running on a good road at a predetermined constant vehicle speed, the waveforms of the output signal from a vehicle speed sensor become the ones as shown in FIG. 1(A) with each period T1, T2, T3, T4 ... of the output signal being equal with each other, while when running on a bad road at the same predetermined constant vehicle speed, the waveforms of the output signal from the same vehicle speed sensor become the ones as shown in FIG. 1(B) with each time period or duration T1', T2', T3', T4' ... being different from each other.

SUMMARY OF THE INVENTION

It is therefore an object of the present invention to provide a shock absorber control system capable of performing stable steering and running of a vehicle by making use of the above phenomena.

It is another object of the present invention to provide a shock absorber control system in which the generation of bounding and rebounding can be alleviated when running on bad roads.

It is a main object of the present invention to provide a shock absorber control system capable of improving the stable handling operation and stable steering of a vehicle, and of realizing in turn the stable running of the vehicle in consideration of the above fact and other factors such as that vehicle speed sensors with a sufficient accuracy are easily commercially available, of late, and that motor vehicles capable of automatic running by making use of these sensors are now under practical use, as well as that shock absorbers for vehicles being manufactured of late, have relatively small attenuation forces, i.e. softened rigidity against bounding, rebounding and rolling in consideration of those vehicles' running on mainly good roads.

It is still another object of the present invention to provide a shock absorber control system in which when running on a bad road, the attenuation forces of the shock absorbers are determined in accordance with road conditions and they are maintained during a predetermined time period which depends on the conditions of acceleration and deceleration.

It is yet still another object of the present invention to provide a method of controlling shock absorbers for a vehicle in which acceleration and deceleration calculated from a vehicle speed signal are compared with predetermined reference acceleration and deceleration and control signals are produced in accordance with the results of the comparisons, which are applied to the shock absorbers so as to control the attenuation forces to the shock absorbers in accordance with the road conditions.

One of the features of the shock absorber control system according to the present invention is characterized in that the shock absorber control system for a motor vehicle having shock absorbers comprises a vehicle speed sensor for generating a vehicle speed signal in response to the rotations of a vehicle wheel, and operation control means for calculating acceleration and deceleration of the vehicle in accordance with the vehicle speed signal from the vehicle speed sensor and for producing control signals in response to the acceleration and deceleration, whereby the attenuation forces of the shock absorbers are regulated in accordance with the acceleration and deceleration of the vehicle.

These and other objects and advantages of the present invention will be apparent from the following description with reference to the accompanying drawings with respect to the preferred embodiments of the invention.

DETAILED DESCRIPTION OF PREFERRED EMBODIMENT

Figure 1A:
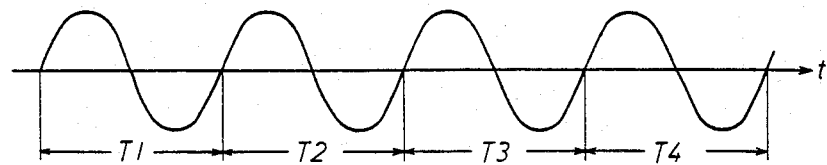
FIGS. 1(A) and 1(B) illustrate waveforms of a vehicle speed signal from a vehicle speed sensor when running on a good road and a bad road, respectively.
Figure 1B:
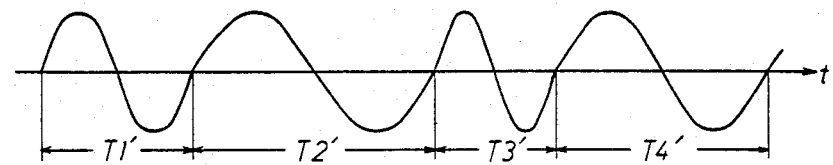
Figure 2:
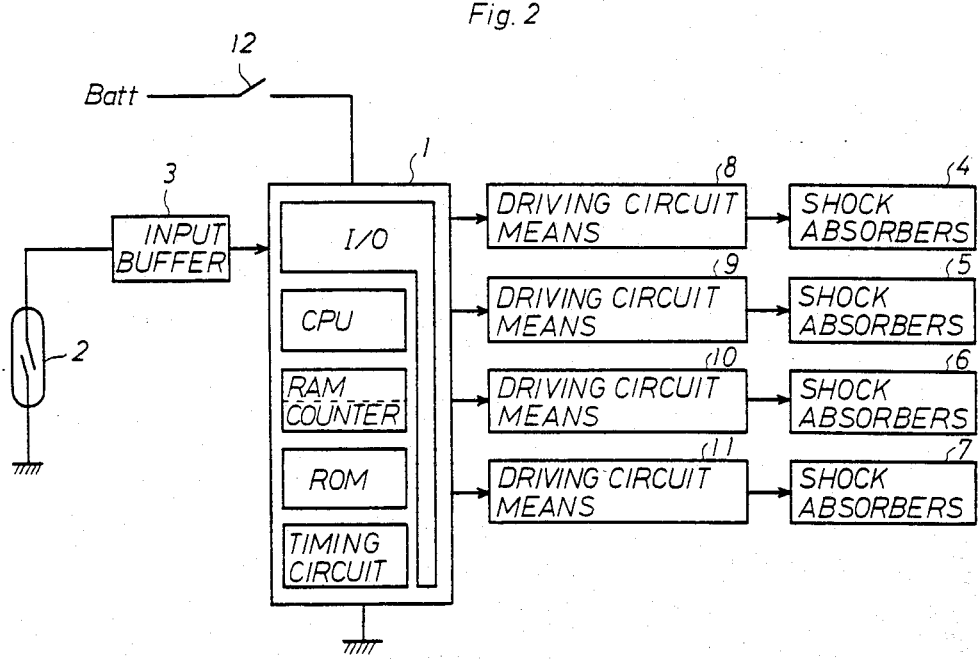
FIG. 2 illustrates an overall shock absorber control system of one embodiment according to the present invention.

Referring to FIG. 2, where the shock absorber control system of one embodiment according to the present invention is shown. The shock absorber control system of the invention mainly comprises an operation control device 1 which may be a microprocessor having a clock circuit or timing circuit for producing clock signals, a central processing unit or CPU which is connected to an input/output device or I/O through a bus, a read only memory or ROM in which a predetermined computer program and other data such as predetermined reference acceleration $\alpha_o$ and predetermined reference deceleration $\beta_o$ are stored, a random access memory or RAM for storing a flag and data to be operated on, read from the ROM, and counter means for counting clock signals from the clock circuit or timing circuit under the control of the CPU, a vehicle speed sensor 2 for generating a vehicle speed signal having frequencies proportional to the number of rotations of a vehicle wheel, an input buffer 3, shock absorbers 4 through 7 which are all of the same construction and which are mounted, for instance, at each vehicle wheel, i.e. two front wheels and two rear wheels, driving circuit means 8 through 11 for driving each of said shock absorber 4 through 7 in response to control signals from the microprocessor 1, respectively, and a key switch 12 for operating the microprocessor 1.

Figure 3:
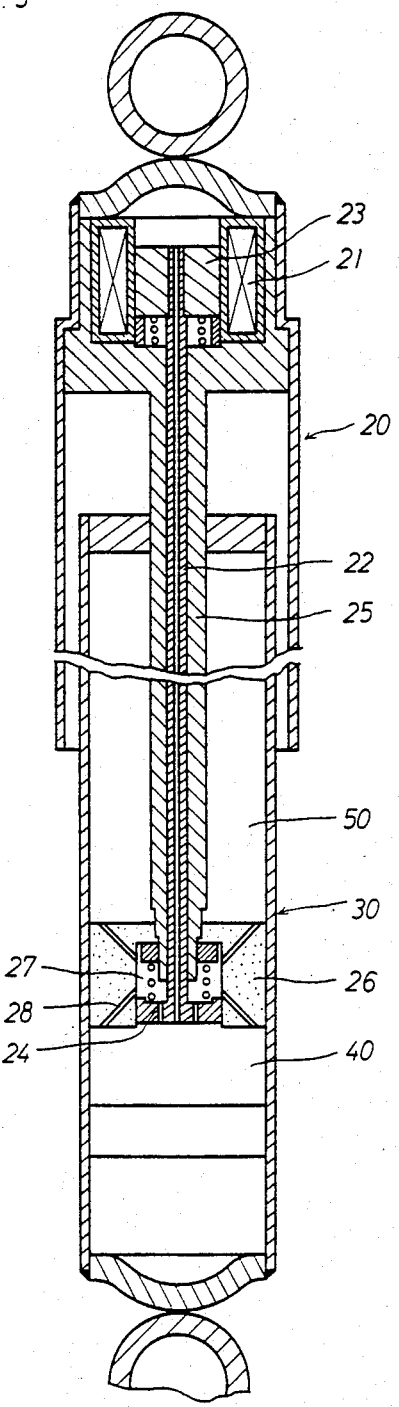
FIG. 3 illustrates one embodiment of a shock absorber for use in the shock absorber control system shown in FIG. 2.

FIG. 3 shows a cross sectional view of the construction of one of the shock absorbers shown in FIG. 2. In FIG. 3, there are provided within an upper moving cylindrical casing 20, a coil 21 which is to be electrically connected to the driving circuit 8, 9, 10, and 11 (see FIG. 2) and a ring core 23 to be moved and retained in the upper direction together with a link rod 22, by a magnetic force generated when the coil 21 is energized. The shock absorber is also provided with a piston rod 25, and a piston 26 also within the upper moving cylindrical casing 20. In FIG. 3, there are provided within a lower cylindrical casing 30, a flow control valve 24, a path 28 communicating with a valve chamber 27, a first oil chamber 40, and a second oil chamber 50.

In operation, the shock absorber operates in such manner that when the coil 21 is rendered non-conductive, i.e. the coil 21 is not energized, the flow control valve 24 mounted at the extreme end of the link rod 22 and the piston 26 provided at the extreme end of the piston rod 25 are maintained in the condition as shown in FIG. 3, and the oil existing between the first oil chamber 40 and the second oil chamber 50 relatively flows smoothly therebetween. In other words, the attenuation force of each absorber 4, 5, 6, and 7 is maintained at a normal level, i.e. is maintained relatively low.

On the other hand, when the coil 21 of each shock absorber is energized by each driving circuits 8, 9, 10, and 11, respectively because of the magnetic force produced by the coil 21 the link rod 22 moves in the upper direction together with the core 23. As a result, the path 28 which communicates the valve chamber 27 with the first oil chamber is blocked, and it follows that a circulating or flow resistance existing between the first oil chamber 40 and the second oil chamber 50 becomes high, thus increasing the attenuation force of each shock absorber 4, 5, 6, and 7. In this case, while the coil 21 is in the energized condition, the path 28 remains blocked by the flow control valve 24 and the attenuation force of each shock absorber 4, 5, 6, and 7 is maintained rather high.

The operation of the shock absorber control system according to the present invention thus constructed as shown in FIG. 2, will now be described with reference to the flow chart shown in FIG. 4. When the key switch 12 to the microprocessor 1 is closed, the microprocessor 1 is to start the following processings or operations.

Figure 4:
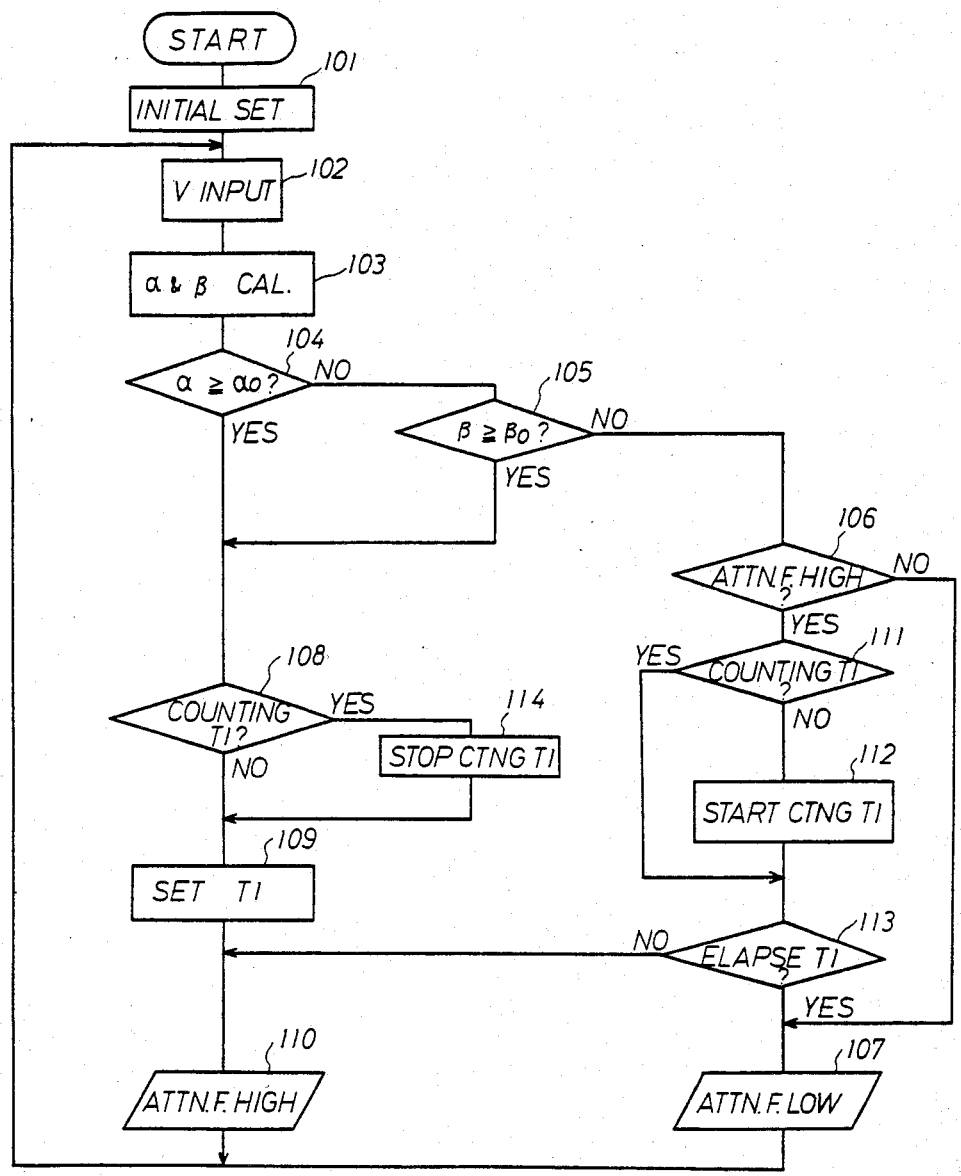
FIG. 4 illustrates a flow chart for explaining the operations of the system shown in FIG. 2.

In FIG. 4, in the step 101, an initial set operation is performed, e.g. the data corresponding to the two reference accelerations read from the ROM $\alpha_o$ and $\beta_o$ are stored into the RAM in the microprocessor 1 and the operation now moves to the next step.

In the next step 102, the current actual vehicle speed V is calculated in accordance with a vehicle speed signal from the vehicle speed sensor 2 through the input buffer 3.

In the step 103, the acceleration $\alpha$ and deceleration $\beta$ are calculated in accordance with the vehicle speed V which has just been calculated, during the program execution at this time, and the vehicle speed V', which was calculated during the program execution performed a predetermined number of times before, for example, in the previous cycle time, and the operation now moves to the next step.

In the step 104, a decision or determination is performed whether or not the acceleration $\alpha$ thus calculated is larger than the predetermined reference acceleration $\alpha_o$. Preferably, the reference acceleration $\alpha_o$ will be chosen within the range of 0.5 to 1.0 g, where g indicates the dynamic acceleration. If the result of the decision is NO, the operation then moves to the step 105.

In the step 105, a decision or determination is performed whether or not the deceleration $\beta$ thus calculated is larger than the predetermined reference deceleration $\beta_o$. Preferably, the reference deceleration $\beta_o$ here will be chosen within the range of 0.5 g to 1.0 g, where g indicates the dynamic deceleration. If the result of the decision is NO, the operation then moves to the step 106.

In the step 106, when the acceleration $\alpha$ is less than the reference acceleration $\alpha_o$ and the deceleration $\beta$ is also less than the reference deceleration $\beta_o$, a decision is made whether or not each attenuation force of each shock absorber 4 through 7 is high from an attenuation force flag attached (not shown). If the result of the decision is NO, the operation then moves to the step 107.

In the step 107, when the attenuation forcs are determined normal, i.e. the attenuation forces are low and after a predetermined time period T1, which will be referred to later is elapsed, control signals for either maintaining the attenuation forces to be the normal value respectively or for decreasing by a predetermined amount are applied to the driving circuits 8 through 11. Also in this step 107, the attenuation force flag is reset so that the attenuation forces may tend to be low.

Returning to the decision making steps 104 or 105, if the result of the decision in the step 104 or in the step 105 is YES, that is, the acceleration $\alpha$ or deceleration $\beta$ are larger than the reference acceleration or the reference deceleration, $\alpha_o$ and $\beta_o$ respectively, the operation moves to the step 108.

In the step 108, when the above acceleration $\alpha$ is larger than the reference acceleration $\alpha_o$ or when the above deceleration $\beta$ is larger than the reference deceleration $\beta_o$, a decision is made whether or not the counter for counting the predetermined time period T1 is counting. If the result of the decision is NO, the operation then moves to the next step 109.

In the step 109, a value corresponding to the time period T1 is set into the counter and the operation moves to the next step.

In the step 110, each control signal for either increasing or maintaining the attenuation force as it is, is applied to each driving circuit 8 to 11. Also, in this step the attenuation force flag is set, indicating that the attenuation forces tend to be high.

On the other hand, in the step 111, when the result of the decision was high or tended to be high in the decision step 106, a decision is made whether or not the counter is counting and the operation then moves to the nest step.

In the step 112, when the counter is not counting. the counting operation of the counrer is started, and the operation then moves to the next step 113.

In the step 113, a decision is made as to whether or not the counter has terminated the counting of the time period T1. If the result of the decision is YES, the operation moves to the step 107 which was already explained in the foregoing, while if the result of the decision is NO, the operation moves to the step 110 of which description has been already made.

Returning to the step 108, if the result of the decision is YES, the operation moves to the step 114 and in this step the counter is made to stop counting and then the operation proceeds to step 109, which has been described above.

Figure 5:
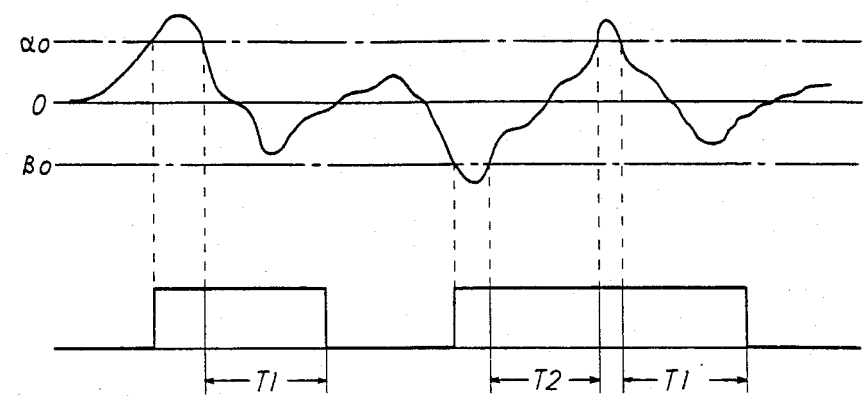
FIG. 5 illustrates waveforms of the acceleration and deceleration characteristics in which the predetermined reference acceleration and deceleration levels are shown, and the time periods T1 and T2 for controlling the attenuation forces of shock absorbers respectively.

When a car is running on a road with good road conditions at a constant speed, the acceleration and deceleration of the vehicle are distributed in the vicinity of zero value as shown in FIG. 5. FIG. 5 shows waveforms of the acceleration and deceleration characteristics in which the predetermined reference acceleration and deceleration levels are illustrated as the levels $\alpha_o$ and $\beta_o$, respectively. FIG. 5 illustrates the time periods of T1 and T2 which lie within the two reference acceleration and deceleration levels or values $\alpha_o$ and $\beta_o$ and which have the relationship T1>T2.

Since the results of the decisions in the steps 104 and 105 in FIG. 4 have been NO, while the result of the decision in the steps 106 has been also NO, the microprocessor 1 will repeatedly execute a closed loop consisting of the steps 102, 103, 104, 105, 106 and 107. Accordingly, when running on the good road, the attenuation force of each shock absorber 4 through 7 of the vehicle is in the normal level, i.e. the attenuation forces of the shock absorbers 4 through 7 absorbs the shock produced between the shaft of the vehicle and the vehicle body with the normal rigidity as the coil 21 is maintained in an unenergized condition and alleviates the shock thus produced.

After that, when the vehicle moves from the running on the good road described above to the running on a bad road, conditions such as that the acceleration $\alpha$ calculated in the step 103 and the deceleration $\beta$ calculated in the same step 103 exceed the predetermined acceleration $\alpha_o$ and the deceleration $\beta_o$, often occur. For instance, when the acceleration $\alpha$ is above the reference acceleration $\alpha_o$, the result of the decision in the step 104 turns to YES. Therefore, the closed loop consisting of the steps 102, 103, 104, 105, 106, and 107, which has been repeatedly executed, is now released, and after the execution of the step 104, the step 108 will be now executed. However, since the counter has not yet started counting in the step 108, the result of the decision now becomes NO and the operation moves to the next step 109.

In the step 109, the value corresponding to the predetermined time period T1 is set into the counter, and the operation now moves to the step 110.

In the step 110, the control signals for reversing the above conditions are produced and applied to the driving circuits 8 to 11 so as to increase the attenuation forces of the shock abosorbers 4 through 7, respectively. Moreover, in this step, the attenuation force flag is also set so as to allow the flag to be indicated high.

Furthermore, when the acceleration $\alpha$ is above the reference acceleration $\alpha_o$, the result of the decision in the step 104 always becomes YES while the result of the decision in the step 108 becomes NO, the closed loop consisting of the steps 102, 103, 104, and the steps 108, 109, and 110 is repeatedly executed. Namely, in the step 110, the operation for maintaining the attenuation forces of the shock absorbers 4 through 7 high is performed and the driving circuits 8 through 11 drive the shock absorbers 4 through 7 respectively, so as to increase the attenuation forces to be high. Accordingly, the flow control valve 24 blocks the path 28 so that each attenuation force of each shock abosorber 4 through 7 is maintained high as compared with that during the running on the good road described in the foregoing.

When the acceleration $\alpha$ becomes below the reference acceleration $\alpha_o$, the result of the decision in the step 104 now becomes NO, so that the steps 104 and 105 are successively executed. In this case, since the result of the decision in the step 105 is NO, as the deceleration is less than the reference decelration $\beta_o$, the operation now moves to the next step 106.

In the step 106, a decision is made whether or not the attenuation forces are high and the result of the decision becomes YES as the attenuation force flag has been set to be high as described in the step 110. After the execusion of the step 110, the next step 111 is to be executed. The result of the decision in the step 111 becomes NO, since the counter has not yet started counting and the operation now moves to the next step 112. In the step 112, the counting operation is started.

In the step 113, the decision is made whether or not the time period T1 has been elapsed and the result of the decision becomes NO in this case as the counting operation has just been started. The operation now moves to the next step 110 and in this step, the output processing is performed so as to maintain the attenuation force of each shock absorber 4 through 7 to be high.

Before the predetermined time period T1 is elapsed from the starting of the counting by the counter, when the deceleration $\beta$ becomes above the reference deceleration $\beta_o$, the closed loop consisting of the steps 102, 103, 104, 105, 106, 111, 113, and 110, which has been repeatedly executed until that time, is now released as the result of the decision being YES in the step 105 and now the operation moves to the step 108.

In the step 108, since the counter is under counting operation, the result of the decision becomes YES and when the next step 114 is executed, the counting operation by the counter stops. The operation now moves to the step 109. In the step 109, the value corresponding to the predetermined time period T1 is now set into the counter and the operation now moves to the step 110.

In the step 110, the operation for producing the output signals is performed so as to still maintain the attenuation forces of the shock absorbers 4 through 7 to be high. While the deceleration $\beta$ is above the reference deceleration $\beta_o$, the closed loop consisting of the steps 102, 103, 104, 105, 108, 109, and 110 is repeatedly executed and the operation for producing the output signals continues so as to maintain the attenuation force of the shock absorbers 4 through 7 to be high.

When the deceleration $\beta$ becomes below the reference deceleration $\beta_o$, the result of the decision in the step 105 now becomes NO and after the step 105 is executed, the steps 106 and 111 are successively executed. Since the result of the decision in the step 111 is NO, the counting by the counter starts. After that, the operation after the start of the counting by the counter is similarly executed and the output processing for maintaining the attenuation forces of the shock absorbers 4 through 7 to be high continues until the predetermined time period T1 is elapsed. After this operation, when the acceleration $\alpha$ again becomes above the reference acceleration $\alpha_o$ before the predetermined time period T1 is elapsed, the output processing for maintaining the attenuation force to be high continues until such time that at least the predetermined time period T1 is elapsed after the acceleration $\alpha$ becomes below the reference acceleration $\alpha_o$ similarly as in the above case, and the attenuation forces are maintained high.

In the manner described, when the acceleration $\alpha$ is larger than the reference acceleration $\alpha_o$, the microprocessor 1 performs the output processing for reversing and maintaining the attenuation forces 4 through 7 of the shock absorbers to be high during the sum time periods (T0+T1) of the time period T0 during which at least the acceleration $\alpha$ is above the reference acceleration $\alpha_o$ and the time period of T1 during which the acceleration $\alpha$ is below the reference acceleration $\alpha_o$, As a result, the attenuation forces of the shock absorbers 4 through 7 are maintained high. During this time period, when the deceleration $\beta$ is above the reference deceleration $\beta_o$, the microprocessor 1 continues to perform the output processing for maintaining the attenuation forces to be high as described above similarly, during the sum periods (T0+T1) of the predetermined time period T0 during which at least the deceleration $\beta$ is above the reference deceleration $\beta_o$ and the predetermined time period T1, and the attenuation forces of the shock absorbers 4 through 7 are maintained high.

Moreover, when the acceleration $\alpha$ and the deceleration $\beta$ are less than the reference acceleration $\alpha_o$ and the reference deceleration $\beta_o$ respectively, and after the predetermined time period is elapsed, the result of the decision in the step 113 now becomes YES, and the output processing for maintaining the attenuation force to be low in the step 107 is executed and attenuation forces of the shock absorbers 4 through 7 become the normal level, i.e. decrease to be low.

In the manner described, according to the present invention when running on the bad road, the attenuation forces of the shock absorbers are maintained high during the sum periods of the time period T0 during which at least the acceleration $\alpha$ is above the reference acceleration $\alpha_o$ and the predetermined time period T1 which starts after the elapse of the time period T0, as well as the sum periods of the time period T0 during which the deceleration $\beta$ is above the reference deceleration $\beta_o$ and the predetermined time period T1 which starts after the former time period has been elapsed. Hence, each attenuation force of each shock absorber 4 through 7 is determined in accordance with the time period for maintaining each attenuation force to be high in response to the conditions of the bad road, thus enabling the occurance or generation of bounding and rebounding when running on the bad roads to be alleviated.

As described in the foregoing, the shock absorber control system for a motor vehicle according to the present invention comprises a vehicle speed sensor for generating a speed signal in accordance with the rotations of a wheel and an operation control device for calculating the acceleration and deceleration in accordance with the speed signal from the vehicle speed sensor and for producing control signals in response to the acceleration and deceleration, whereby the attenuation force of the shock absorbers are regulated in accordance with the acceleration and the deceleration.

With this construction, the shock absorber control system according to the present invention accurately determines the road conditions and it enables the attenuation forces of the shock absorbers to be obtained in accordance with the road conditions, particularly on the bad roads. Accordingly, the shock absorber control system according to the present invention enables the steering stability when running on bad roads to be improved and it can also realize safe running of the vehicle.

Moreover, the application of the present invention to a motor vehicle for performing an auto-drive running by making use of a vehicle speed sensor enables the auto-drive control and the shock absorber control to be performed at the same time in accordance with the speed signal from the same car speed sensor.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A shock absorber control system for a motor vehicle having shock absorbers, said system comprising:
   a vehicle speed sensor for generating a vehicle speed signal in accordance with the rotations of a wheel; and operation control means having a microprocessor and a RAM for calculating acceleration and deceleration with respect to a moving direction of said vehicle from the vehicle speed signal from the vehicle speed sensor and producing a control signal dependent upon said calculated acceleration and deceleration, whereby attenuation forces of said shock absorbers are regulated in accordance with said control signal.

2. A shock absorber control system for a vehicle as set forth in claim 1 wherein said acceleration and said deceleration thus calculated are compared with predetermined reference acceleration and predetermined reference deceleration levels, respectively.

3. A shock absorber control system for a vehicle as set forth in claim 2 wherein said predetermined reference acceleration level is within the range of 0.5 g to 1.0 g, where g indicates dynamic acceleration and said predetermined reference deceleration level is also within the range of 0.5 g to 1.0 g, where g indicates dynamic deceleration, respectively.

4. A method of performing the control of shock absorbers for a vehicle which comprises the steps of:
   calculating actual vehicle speed V in accordance with a vehicle speed signal from a vehicle speed sensor;
   calculating acceleration $\alpha$ and deceleration $\beta$ in accordance with said actual vehicle speed V calculated in a current execution of a program and a vehicle speed V' calculated in a past execution of the program;
   determining whether said acceleration $\alpha$ is above a predetermined reference acceleration $\alpha o$ and whether said deceleration $\beta$ is above a predetermined deceleration $\beta o$; and
   producing from an operation control means control signals for either maintaining attenuation forces on each of said shock absorbers to a normal value, i.e., to be low or reducing the attenuation forces below the normal value after the elapse of a predetermined time period; and
   applying said control signals to the shock absorbers through driving circuits.

5. A method of performing the control of shock absorbers for a vehicle as set forth in claim 4 wherein the method further comprises the steps of: determining whether the attenuation forces of the shock absorbers are high; and determining whether a counter is counting said predetermined time period when the attenuation forces are high.

6. A method of performing the control of shock absorbers for a vehicle as set forth in claim 4 wherein the method further comprises the steps of: determining whether an attenuation force is at said normal level; storing the attenuation force at said normal level when said attenuation force is determined to be at said normal level; and maintaining the attenuation forces of the shock absorbers to be normal, i.e., to be low when the vehicle is running on a good road.

7. A method of performing the control of shock absorbers for a vehicle as set forth in claim 4 wherein the method further comprises the step of maintaining the attenuation forces of the shock absorbers to be high through the energizations of the driving circuits when the vehicle is running on a bad road.

8. A method of performing the control of shock absorbers for a vehicle as set forth in claim 7 wherein the method further comprises the step of keeping said attenuation forces high when said acceleration $\alpha$ and said deceleration $\alpha$ are less than the reference acceleration $\alpha o$ and the reference deceleration $\beta o$, respectively, until said predetermined time period elapses.

9. A method of performing the control of shock absorbers for a vehicle as set forth in claim 8 wherein the method further comprises the steps of: stopping the counting of the counter when the deceleration $\beta$ is above the reference deceleration $\beta_o$ before the elapse of the predetermined time period; and newly setting the value corresponding to the predetermined time period so as to maintain the attenuation forces of the shock absorbers to be high.

10. A method of performing the control of shock absorbers for a vehicle as set forth in claim 4 wherein the method further comprises the steps of producing output signals to the shock absorbers through the driving circuits by a microprocessor during the sum period (T0+T1) of a time period T0 during which the acceleration $\alpha$ is above the reference acceleration $\alpha_o$ and the time period T1 during which the acceleration $\alpha$ becomes below the reference acceleration $\alpha_o$ so as to maintain the attenuation forces of the shock absorbers to be high; and continuing the production of the output signals for maintaining the attenuation forces to be high during the sum period (T0+T1) during which the deceleration $\beta$ is above the reference deceleration $\beta_o$ and the predetermined time period T1.

11. A method of performing the control of shock absorbers for a vehicle as set forth in claim 4 wherein the method further comprises the step of producing no output signals to the shock absorbers through the driving circuits when the acceleration $\alpha$ and the deceleration $\beta$ are less than the reference acceleration $\alpha_o$ and the reference deceleration $\beta_o$ and after the elapse of the predetermined time period so as to reduce the attenuation forces of the shock absorbers to low level.

12. A method of performing the control of shock absorbers for a vehicle as set forth in claim 5 wherein said reference acceleration is within the range of 0.5 g to 1.0 g and said reference deceleration is also within the range of 0.5 g to 1.0 g, where g indicates both dynamic acceleration and dynamic deceleration.

13. A method of controlling a shock absorber of a vehicle comprising the steps of:
   sensing a running speed of said vehicle;
   calculating an acceleration of said vehicle with respect to a running direction of said vehicle from said sensed running speed;
   comparing said calculated acceleration with a predetermined reference acceleration; and
   changing an attenuation force of said shock absorber in response to a predetermined change in the result of said comparing step.

14. A method as set forth in claim 13 further comprising the step of holding said changed attenuation force during a predetermined interval of time after another predetermined change in the result of said comparing step from said predetermined change.

15. A method as set forth in claim 13, wherein said acceleration calculating step comprises the step of obtaining sensed running speed at different points of time.

* * * * *